(12) United States Patent
Na et al.

(10) Patent No.: US 9,377,573 B2
(45) Date of Patent: Jun. 28, 2016

(54) LIGHTING DEVICE AND DISPLAY DEVICE HAVING THE LIGHTING DEVICE

(71) Applicant: LG INNOTEK CO., LTD., Seoul (KR)

(72) Inventors: Se Woong Na, Seoul (KR); Min Jae Kim, Seoul (KR); Hyun Gyu Park, Seoul (KR); In Hee Cho, Seoul (KR); Man Hue Choi, Seoul (KR); Seung Kwon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 159 days.

(21) Appl. No.: 14/339,171

(22) Filed: Jul. 23, 2014

(65) Prior Publication Data

US 2015/0029753 A1   Jan. 29, 2015

(30) Foreign Application Priority Data

Jul. 23, 2013   (KR) ........................ 10-2013-0086619

(51) Int. Cl.
*F21V 19/00* (2006.01)
*F21V 8/00* (2006.01)

(52) U.S. Cl.
CPC .............. *G02B 6/0011* (2013.01); *G02B 6/009* (2013.01)

(58) Field of Classification Search
CPC ....... G02B 6/0036; G02B 6/0038; B43L 1/10
See application file for complete search history.

(56) References Cited

U.S. PATENT DOCUMENTS

| 8,177,381 B2 * | 5/2012 | Hong | ................. | G02B 6/0025 |
| | | | | 362/612 |
| 2011/0211366 A1 * | 9/2011 | Huang | ................ | G02B 6/0001 |
| | | | | 362/612 |
| 2012/0236228 A1 * | 9/2012 | Tang | ........................ | F21S 8/00 |
| | | | | 349/61 |
| 2014/0126243 A1 * | 5/2014 | Blessitt | ............... | G02B 6/0091 |
| | | | | 362/612 |

* cited by examiner

*Primary Examiner* — Elmito Breval
(74) *Attorney, Agent, or Firm* — Saliwanchik, Lloyd & Eisenschenk

(57) ABSTRACT

Provided is a lighting device, including: a circuit board in which light emitting elements are mounted to one surface of a supporting substrate; a substrate housing disposed to be spaced apart from another surface opposite to the one surface of the supporting substrate; and a distance regulating portion formed between the circuit board and the substrate housing to adjust a spaced distance between the circuit board and the substrate housing according to movement of the circuit board, wherein the distance regulating portion functions to fix the circuit board to the substrate housing via a fixing element formed in the circuit board and the substrate housing.

20 Claims, 5 Drawing Sheets

LIGHTING DEVICE AND DISPLAY DEVICE HAVING THE LIGHTING DEVICE

CROSS-REFERENCE TO RELATED APPLICATION

This application claims the benefit under 35 U.S.C. §119 Korean Patent Application No. 10-2013-0086619, filed on Jul. 23, 2013, which is hereby incorporated by reference in its entirety.

BACKGROUND

1. Technical Field

Embodiments of the present invention relate to ways to effectively fix a circuit board and a light guide plate.

2. Related Arts

A liquid crystal display (LCD) has no self-luminous which can make its own light, a separate lighting device is needed for all the liquid crystal display devices. Such a lighting device serves as a light source of the liquid crystal display device, and a backlight unit (BLU) refers to a complex composed of a light source itself for irradiating light to a rear surface of a liquid module, a power circuit for driving the light source, and all components for enabling uniform flat light to be formed.

The liquid crystal display device becomes gradually thin, and accordingly, a reduction in a bezel width of the liquid crystal display device has been needed. As one example, in order to reduce the bezel width, the structure of a circuit board on which light emitting elements are mounted, or the structure of a lighting device including a light guide plate for guiding light generated from the light emitting elements has been changed. That is, efforts to reduce the bezel width of the liquid crystal display device by reducing a distance between the circuit board and the light guide plate have been performed. Furthermore, when the liquid crystal display is driven, the light emitting elements are frequently damaged because the light guide plate expands due to heat generated from the light emitting elements.

Accordingly, ways to protect the light emitting elements from the light guide plat have been practically needed.

BRIEF SUMMARY

An aspect of embodiments of the present invention may provide a lighting device which is configured such that a distance regulating portion is formed between a circuit board and a substrate housing so that a spaced distance between the circuit board and the substrate housing can be adjusted according to movement of the circuit board.

Another aspect of embodiments of the present invention may provide a lighting device which is configured such that when a circuit board is moved backward by a light guide plate, a distance regulating portion controls a spaced distance between the circuit board and a substrate housing using elasticity, thereby preventing light emitting elements mounted to the circuit board from being damaged by the light guide plate.

A further aspect of embodiments of the present invention may provide a lighting device which is configured such that projections or hooks are inserted into a fixing element formed in a circuit board and a substrate housing, or a distance regulating portion can be effectively fixed between the circuit board and the substrate housing via an adhesive material.

Yet another aspect of embodiments of the present invention may provide a lighting device which is configured such that the width, thickness, arrangement position, and number of a distance regulating portion are determined according to at least one of the number of light emitting elements mounted to a circuit board, an arrangement position of the light emitting elements and a size of a light guide plate, thereby forming the distance regulating portion in optimum conditions.

Still another aspect of embodiments of the present invention may provide a display device which is provided with a lighting device having a distance regulating portion formed between a circuit board and a substrate housing so that a spaced distance between the circuit board and the substrate housing can be adjusted by the distance regulating portion according to movement of the circuit board.

According to an aspect of the embodiments of the present invention, a lighting device may include: a circuit board in which light emitting elements are mounted to one surface of a supporting substrate; a substrate housing disposed to be spaced apart from another surface opposite to the one surface of the supporting substrate; and a distance regulating portion formed between the circuit board and the substrate housing to adjust a spaced distance between the circuit board and the substrate housing according to movement of the circuit, wherein the distance regulating portion enables the circuit board to be fixed to the substrate housing via a fixing element formed in the circuit board and the substrate housing.

The distance regulating portion may include projections formed in a part corresponding to the fixing element, and thus the projections may be inserted into the fixing element so that the circuit board can be fixed to the substrate housing.

The fixing element may be formed larger than a width of the distance regulating portion inserted into the fixing element.

The distance regulating portion may be made of an elastic material, and the spaced distance between the circuit board and the substrate housing may be adjusted according to the movement of the circuit board due to the elastic material.

The distance regulating portion may be configured such that at least two distance regulating portions are arranged in a horizontal direction between the circuit board and the substrate housing, and the elastic material may be changed according to an arrangement position in the vertical direction.

The distance regulating portion may be arranged on the other surface corresponding to a spaced portion between the light emitting elements.

The lighting device may further include a light guide plate disposed to be spaced apart from the circuit board, wherein a width or a thickness of the distance regulating portion may be adjusted according to at least one of the number of the light emitting elements, an arrangement position of the light emitting elements, and a size of the light guide plate.

An arrangement position of the distance regulating portion in a vertical direction between the circuit board and the substrate housing may be adjusted according to at least one of the number of the light emitting elements, the arrangement position of the light emitting elements and the size of the light guide plate.

The distance regulating portion may be configured such that at least two distance regulating portions are arranged in a horizontal direction between the circuit board and the substrate housing, and the number of the distance regulating portions arranged in the horizontal direction may be determined according to the arrangement position in the vertical direction.

The circuit board may be composed of a supporting substrate including a first region to which the light emitting elements are mounted, and a second region extending to be bent from the first region, and the substrate housing may be fixed to the second region of the circuit board.

The circuit board may further include: a bending portion between the first region and the second region; a bending hole formed in the bending portion; a pad portion having pad wirings connected to the light emitting elements in the first region; and a string portion having string wirings intended for transmitting electrical signals to the light emitting elements in the first region or the second region.

According to another aspect of the embodiments of the present invention, a display device may include the lighting device as described above as a backlight unit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
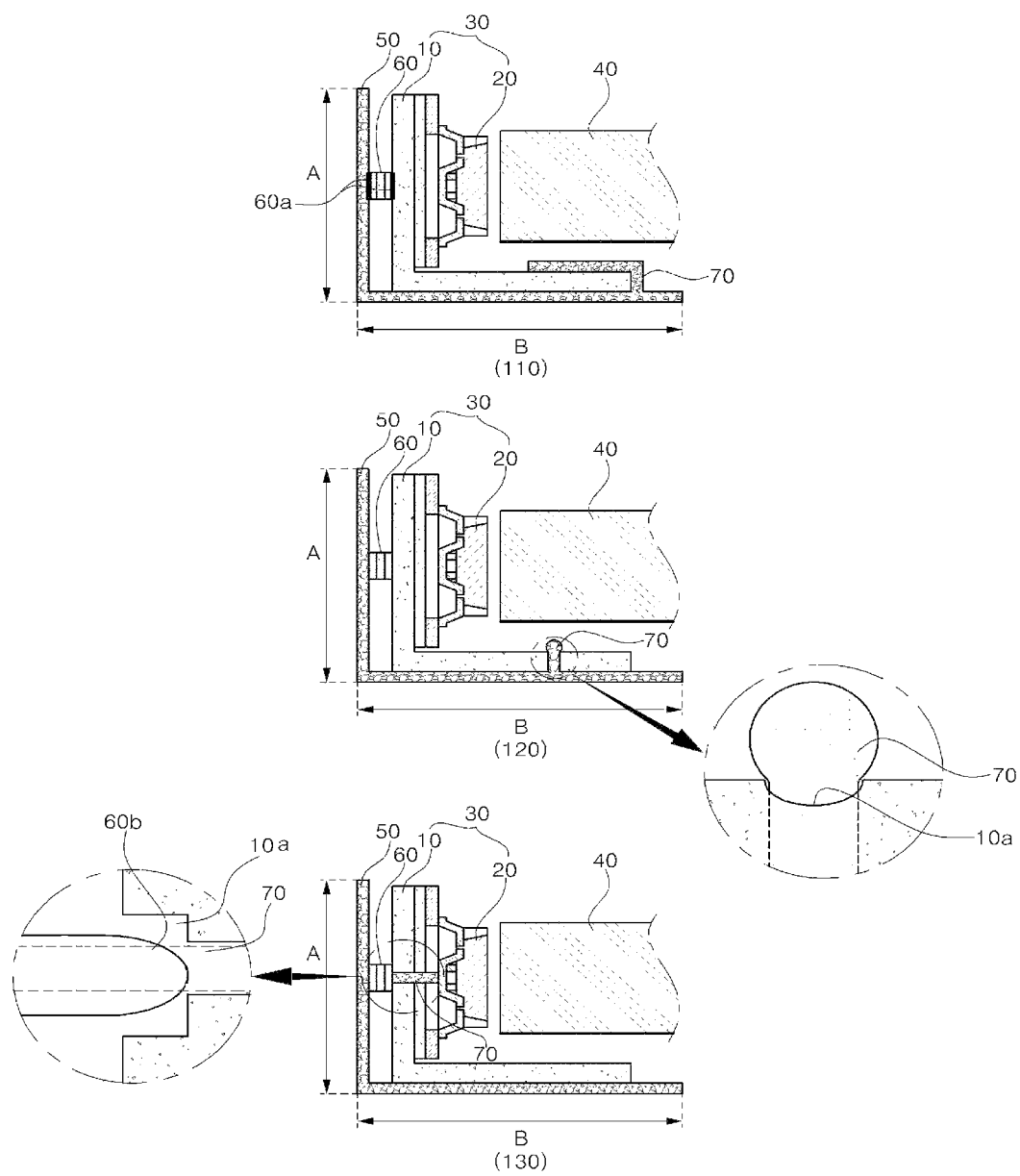
FIG. 1 is a view illustrating a lighting device according to one embodiment of the present invention.

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

FIG. 1 is a view illustrating a lighting device according one embodiment of the present invention.

Referring to FIG. 1, a lighting device 110 according to the present embodiment of the invention includes: a circuit board 30 including a supporting substrate composed of a first region A in which light emitting elements 20 are mounted and a second region B extending to be bent from the first region A; a substrate housing 50 disposed to be spaced apart from another surface opposite to one surface of the supporting substrate 10; a light guide plate 40 disposed to be spaced apart from the circuit board 30; and a distance regulating portion 60 formed between the circuit board 30 and the substrate housing 50 to adjust a spaced distance between the circuit board 30 and the substrate housing 50 according to movement of the circuit board 30.

In particular, the distance regulating portions 60 may enable the circuit board 30 and the substrate housing 50 to be fixed to each other via an adhesive material 60a.

At this time, the substrate housing 50 may be fixed to the second region of the supporting substrate 10 in a ring form 70. Since the light emitting elements 20 are not mounted to the second region, the substrate housing 50 and the circuit board 30 may be fixed to deviate from string wirings.

In another embodiment, a lighting device 120 may be configured such that a fixing element 10a is formed so that a projection 70 of the substrate housing 50 can be inserted into the second region of the supporting substrate 10, and thus the projection 70 of the substrate housing 50 is inserted into the fixing element 10a of the supporting substrate 10 so that the circuit board 30 and the substrate housing can be fixed to each other.

In a further embodiment, a light device 130 may be configured such that the fixing element 10a is formed in a part of the supporting substrate 10 to which the light emitting elements 20 are mounted, the projection 70 of the substrate housing 50 and a projection 60b of the distance regulating portion 60 are inserted into the fixing element 10a so that the distance regulating portions 60, the substrate housing 50 and the circuit board 30 can be fixed together. At this time, the fixing element 10a formed in the supporting substrate 10 may be configured such that the width of a part into which the projection 60a of the distance regulating portion 60 is inserted and the width of a part into which the projection 70 of the substrate housing 50 is inserted are different from each other. This may be because a width of the projection 70 of the substrate housing 50 and a width of the projection 60b of the distance regulating portion 60 are different from each other. Also, the fixing element 10a formed in the supporting substrate 10 may be formed larger than a width of the substrate housing 50, and thus like a long hole, a width of the fixing element 10a may be formed larger than the projection 70 of the substrate housing 50 and a height thereof may be formed smaller than the projection 70 of the substrate housing 50.

In yet embodiment, the circuit board 30 may include a bending hole formed in a bending portion between the first region A and the second region B, a pad portion having pad wirings connected to the light emitting elements 20 and formed in the first region A, and a string portion having string wirings configured to transmit electrical signals to the light emitting elements 20 and formed in the first region A or the second region B.

In the present embodiment, the distance regulating portion 60 is made of an elastic material so that a spaced distance between the circuit board 30 and the substrate housing 50 can be adjusted according to movement of the circuit board 30 by elastic deformation of the elastic material. Also, the distance regulating portion 60 may be configured such that at least two distance regulating portions are arranged in a horizontal direction between the circuit board 30 and the substrate housing 50 and are made of elastic materials having different elastic coefficients according to an arrangement position thereof in the horizontal direction.

The distance regulating portion 60 may be arranged on the other surface corresponding to a spaced portion between the light emitting elements 20.

A width or a thickness of the distance regulating portion 60 may be adjusted according to at least one of the number of the light emitting elements 20, an arrangement position of the light emitting elements 20, and a size of the light guide plate 30.

An arrangement position of the distance regulating portion 60 in a vertical direction between the circuit board 30 and the substrate housing 50 may be adjusted according to at least one of the number of the light emitting elements 20, the arrangement position of the light emitting elements 20, and the size of the light guide plate 40.

The distance regulating portion 60 may be configured such that at least two distance regulating portions are arranged in the horizontal direction between the circuit board 30 and the substrate housing 50, and the number thereof arranged in the horizontal direction may be determined according to an arrangement position in the vertical direction.

Figure 2:
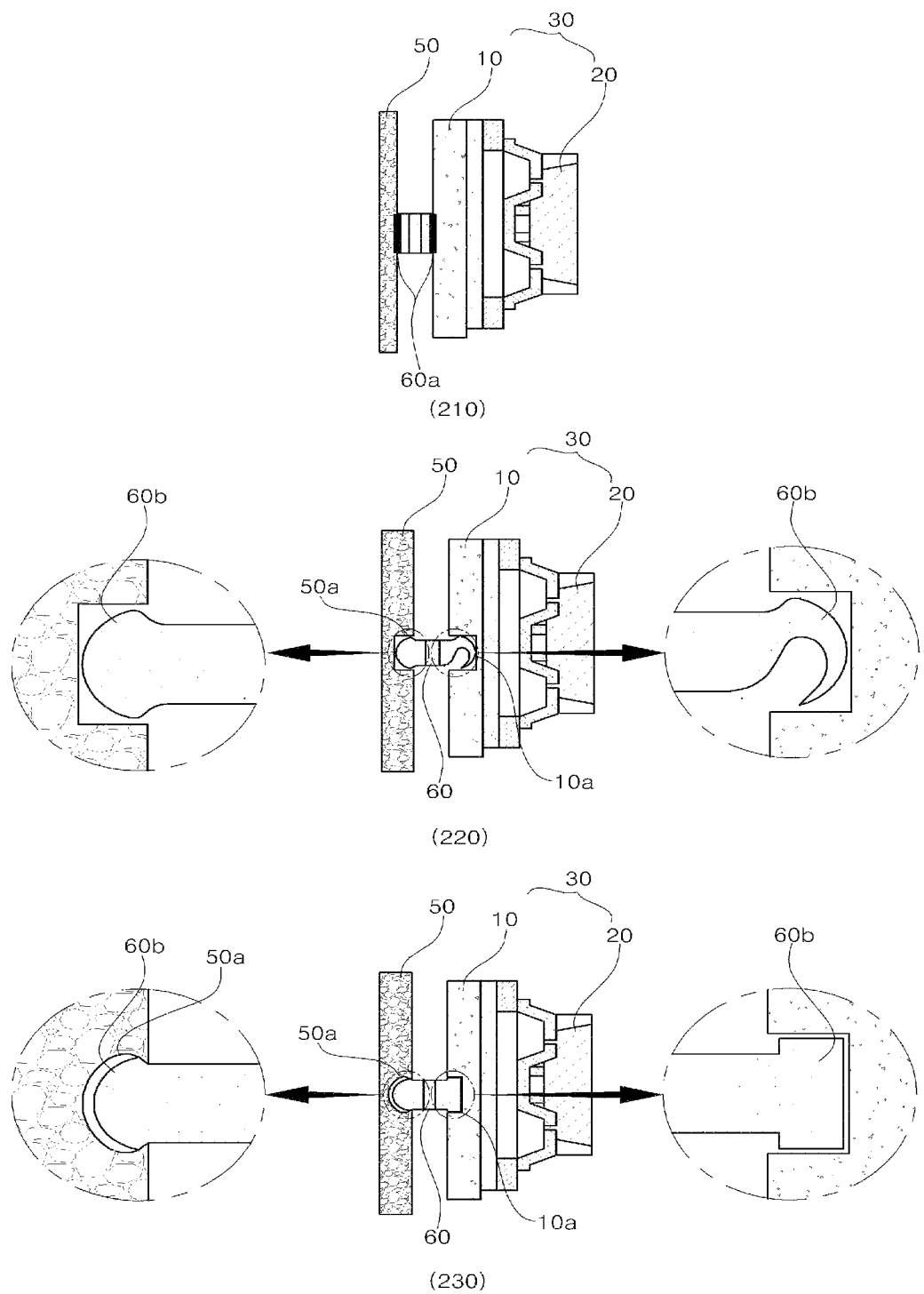
FIG. 2 is a view illustrating one example in which a distance regulating portion is fixed to a circuit board and a substrate housing.

FIG. 2 is a view illustrating one example in which the distance regulating portions are fixed to the circuit board and the substrate housing.

Referring to FIG. 2, the distance regulating portion 60 may be fixed to the circuit board 30 and the substrate housing 50 via the adhesive material 60a (210).

Also, the distance regulating portion 60 may be fixed to the circuit board 30 and the substrate housing 50 via the fixing elements 10a, 50a formed in the circuit board 30 and the substrate housing 50 (220). For example, the projection 60b formed in a portion corresponding to the fixing elements 10a, 50a of the distance regulating portion 60 is inserted into the fixing element 10a, 50a so as to be fixed to the circuit board 30 and the substrate housing 50. The projection 60b may be formed in a hook-like shape. With regard to the projection 60b of the distance regulating portions 60, a projection formed toward the circuit board 30 and a projection formed toward the substrate housing 50 may be identical to or may be different from each other.

Also, the fixing elements 10a, 50a may have a width larger than a width of the distance regulating portion 60 inserted into the fixing elements 10a, 50a (230). Like a long hole, a width of the fixing elements 10a, 50a may be formed larger than the projection 60b of the distance regulating portion 60 and a height thereof may be formed smaller than the projection 60b of the distance regulating portion 60.

Figure 3:
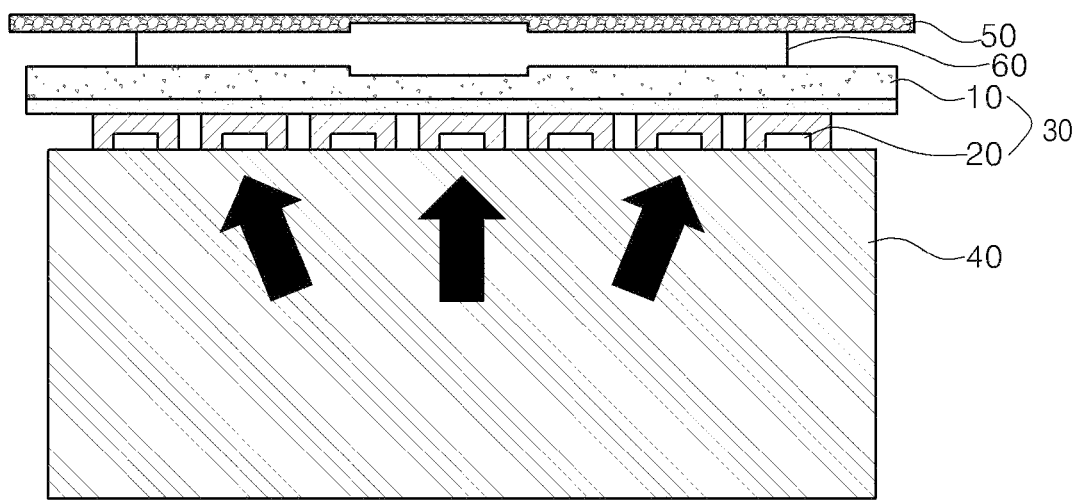
FIG. 3 is a view illustrating a lighting device according to another embodiment of the present invention.

FIG. 3 is a view illustrating a lighting device according to another embodiment of the present invention.

Referring to FIG. 3, the lighting device includes: the circuit board 30 which is configured such that the light emitting elements are mounted to one surface of the supporting substrate 10; the substrate housing 50 disposed to be spaced apart from another surface opposite to the one surface of the supporting substrate 10; the light guide plate 40 disposed to be spaced apart from the circuit board 30; the distance regulating portion 60 formed between the circuit board 30 and the substrate housing 50 so as to adjust a spaced distance between the circuit board 30 and the substrate housing 50 according to movement of the circuit board 30.

In particular, as shown in FIG. 1 or FIG. 2, some distance regulating portions 60 may be partially formed, but one distance regulating portion 60 may be also formed lengthways to correspond to the circuit board 30 and the substrate housing 50, as shown in FIG. 3. Also, a fixing element are provided in the center of the circuit board 30 and the substrate housing 50 in which the distance regulating portion 60 is formed so that the circuit board 30 and the substrate housing can be fixed to each other via the fixing element.

Figure 4:
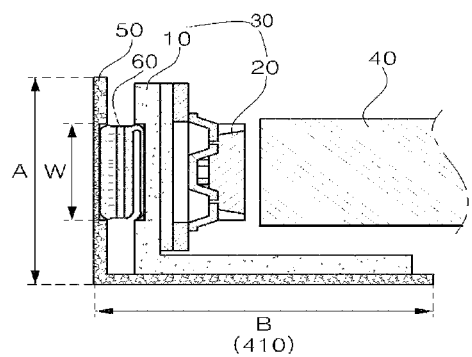
FIG. 4 is a view illustrating various shapes of the distance regulating portion according to one embodiment of the present invention.
Figure 4:
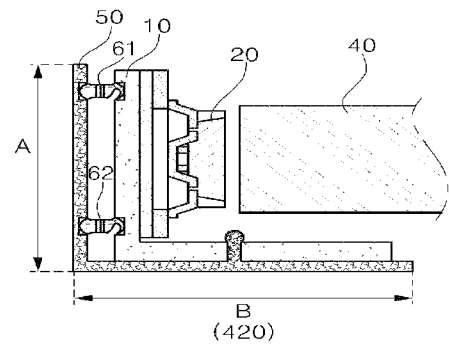
Figure 4:
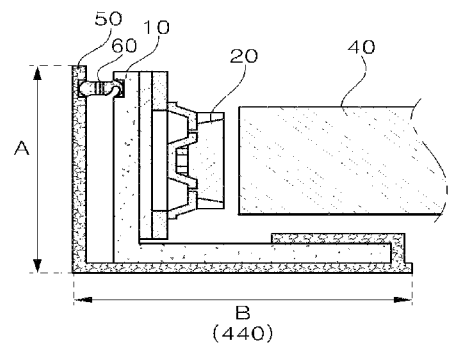
Figure 4:
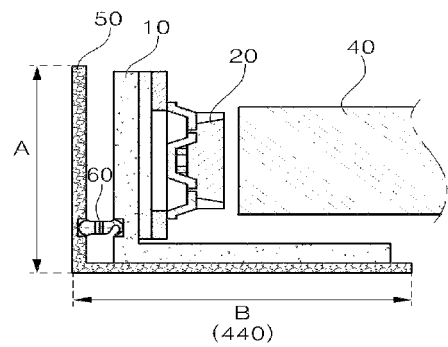

FIG. 4 is a view illustrating various shapes of the distance regulating portion according to one embodiment of the present invention.

Referring to FIG. 4, the distance regulating portion 60 may enable the circuit board 30 and the substrate housing 50 to be fixed via the fixing element formed in the circuit board 30 and the substrate housing 50, and a width or a size of the distance regulating portion 60 may be adjusted according to at least one of the number of the light emitting elements 20, an arrangement position of the light emitting elements 20, and a size of the light guide plate 40 (410). The distance regulating portion 60 functions to absorb power applied from the light guide plate 40 to the circuit board 30, and the applied power is changed according to the number of the light emitting elements 20, the arrangement position of the light emitting elements 20, the size (weight) of the light guide plate 40 so that the width or thickness of the distance regulating portion 60 can be adjusted according to at least one of the number of the light emitting elements 20, the arrangement position of the light emitting elements 20 and the size of the light guide plate 40. For example, as the number of the light emitting elements 20 is gradually increased, or the size of the light guide plate 40 is gradually increased, the width or thickness of the distance regulating portion 60 may be also increased.

Also, the distance regulating portion 60 may enable the circuit board 30 and the substrate housing 50 to be fixed via the fixing element formed in the circuit board 30 and the substrate housing 50, and may be configured such that at least two distance regulating portions are arranged in a horizontal direction between the circuit board 30 and the substrate housing 50 (420).

Also, the distance regulating portion 60 may enable the circuit board 30 and the substrate housing 50 to be fixed via the fixing element formed in the circuit board 30 and the substrate housing 50, and an arrangement position in a vertical direction between the circuit board 30 and the substrate housing 50 may be adjusted according to at least one of the number of the light emitting elements 20, the arrangement position of the light emitting elements 20 and the size of the light guide plate 40. For example, the distance regulating portion 60 may be formed in an optimum arrangement position which allows protection of the lighting emitting elements 20 by most effectively absorbing power applied from the light guide plate 40 to the circuit board 30.

Accordingly, the distance regulating portion 60 may be arranged in an upper part of the vertical direction between the circuit board 30 and the substrate housing 50 (430) or may be arranged in a lower part thereof (440). That is, the distance regulating portion 60 may be arranged in an upper part or a lower part on the basis of the arrangement position of the light emitting elements 20.

In another embodiment, the distance regulating portion may be configured such that at least two distance regulating portions 60 may be arranged in a horizontal direction between the circuit board 30 and the substrate housing 50, and the number of the distance regulating portions which are arranged in the horizontal direction may be determined according to an arrangement position of the distance regulating portions arranged in the vertical direction. For example, the distance regulating portion 60 may be arranged in plural number, the distance regulating portions may be arranged in more number or less number according to the arrangement position in the vertical direction.

That is, when the distance regulating portions 60 are arranged in the middle of the vertical direction, a total of three distance portions 60 may be arranged at both ends and in the middle of the circuit board 30. However, when the distance regulating portions 60 are arranged in one direction such as an upper part or a lower part of the vertical direction, the distance regulating portions 60 may be arranged in more number so as to perform a buffer action. Also, two distance regulating portions may be arranged at any one position of the vertical direction. That is, a total of four distance regulating portions 60 by two may be arranged at a position corresponding to both ends of the circuit board 30.

Figure 5:
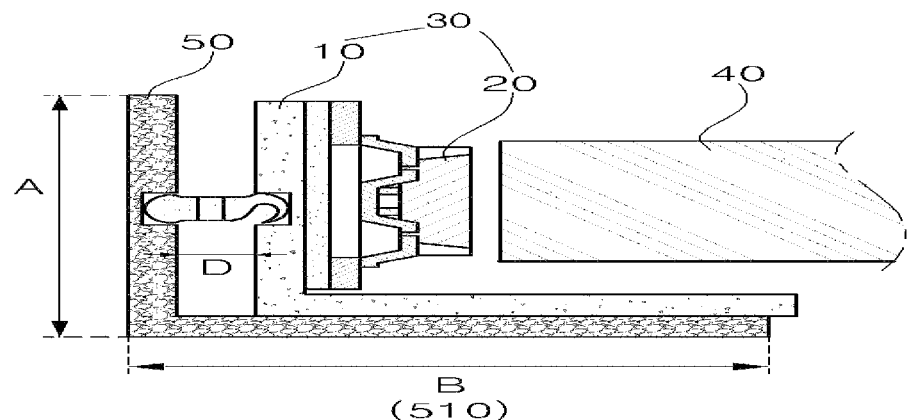
FIG. 5 is a view illustrating one example in which a spaced distance between the circuit board and the substrate housing is controlled by the distance regulating portion.
Figure 5:
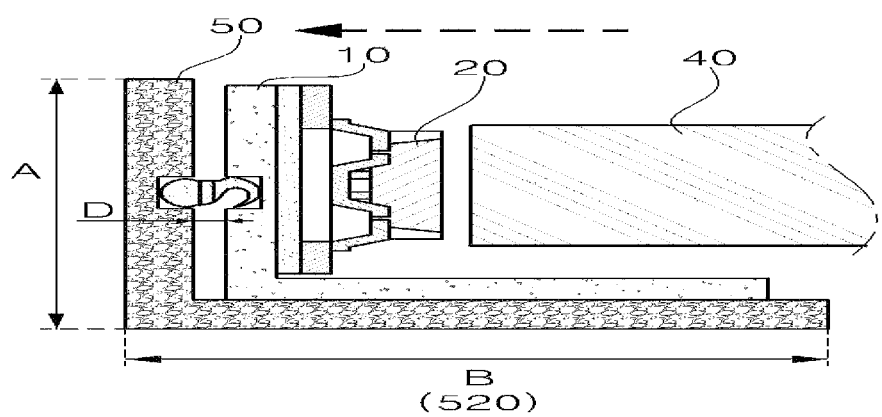
Figure 5:
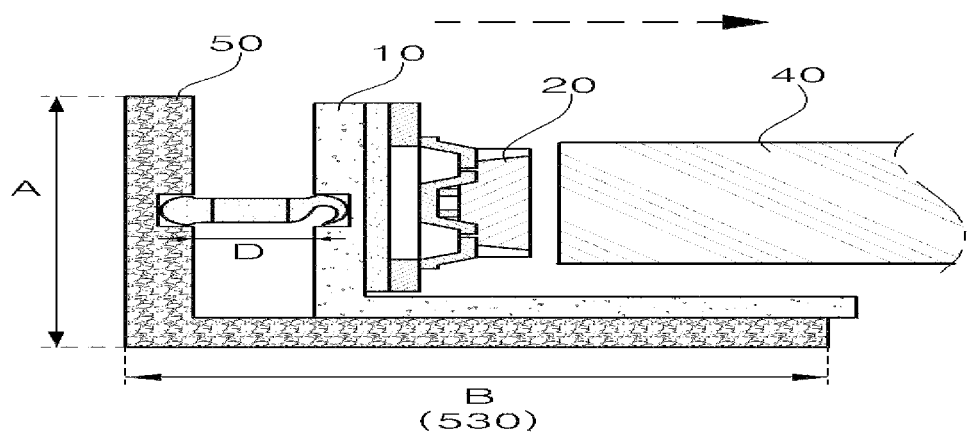

FIG. 5 is a view illustrating one example in which a spaced distance between the circuit board and the substrate housing is adjusted by the distance regulating portion.

Referring to FIG. 5, the distance regulating portion 60 is made of an elastic material so that a spaced distance between the circuit board 30 and the substrate housing 50 can be adjusted according to movement of the circuit board 30 due to the elastic material. That is, when the distance regulating portion 60 is made of the elastic material, the spaced distance may be reduced because the circuit board is moved to the substrate housing 50. Thus, by reducing a width of the distance regulating portion 60, the circuit board 30 is returned to its original position, and the width of the distance regulating portion 60 is also restored in its original state by elasticity, so that the spaced distance can be maintained in its original state.

For example, the distance regulating portion 60 enables the spaced distance D between the circuit board 30 and the substrate housing 50 to be maintained (510), and when the circuit board 30 is moved as the light guide plate 40 is moved toward the circuit board 30, the spaced distance D' between the circuit board 30 and the substrate housing 50 may be reduced (520), and when the light guide plate 40 is returned to its original position, the spaced distance D' may be restored in its original state, namely, the original spaced distance D due to the force of restoration (530).

In another embodiment, the distance regulating portion 60 may be configured such that at least two distance regulating portions are arranged in a horizontal direction between the circuit board 30 and the substrate housing 50, and may be made of different elastic materials according to an arrangement position in the horizontal direction. For example, the elastic materials may be composed so that elasticity of the distance regulating portions 60 arranged at both ends of the circuit board 30 can be larger than that of the distance regulating portion arranged in the middle of the circuit board 30. This is because pushing power toward a surface direction of the circuit board 30 and pushing power toward a side direction of the circuit board may exist in the light guide plate 40 of both ends of the circuit board 30, whereas only pushing power toward the surface direction of the circuit board 30 may exist in the light guide plate 40 in the middle of the circuit board 30, and thus when elasticity of the distance regulating portions 60 arranged at the both ends of the circuit board 30 and provided with greater power is larger than that of the distance regulating portion 60 arranged in the middle of the circuit board 30 and provided with smaller power, the force of restoration to return to an original position may be also larger.

As set forth above, according to some embodiments of the present invention, the distance regulating portions are formed between the circuit board and the substrate housing so that the spaced distance between the circuit board and the substrate housing can be adjusted according to movement of the circuit board.

According to one embodiment of the present invention, when the circuit board is moved backward due to the light guide plate, the spaced distance between the circuit board and the substrate housing is adjusted by the distance regulating portion using elasticity to be narrow so that the light emitting elements mounted to the circuit board can be prevented from being damaged by the light guide plate.

According to one embodiment of the present invention, projections or hooks may be inserted into the fixing elements formed in the circuit board and the substrate housing, or the distance regulating portion may be effectively fixed between the circuit board and the substrate housing via an adhesive material.

According to one embodiment of the present invention, the width, thickness, arrangement position, and number of a distance regulating portion are determined according to at least one of the number of the light emitting elements mounted to the circuit board, the arrangement position of the light emitting elements, and the size of the light guide plate so that the distance regulating portion can be formed in optimum conditions.

According to one embodiment of the present invention, it can be provided with the lighting device in which the distance regulating portion is formed between the circuit board and the substrate housing, and thus it can be provided with the display device which enables the spaced distance between the circuit board and the substrate housing to be adjusted by the distance regulating portion according to movement of the circuit board.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A lighting device, comprising:
a circuit board in which light emitting elements are mounted to one surface of a supporting substrate;
a substrate housing disposed to be spaced apart from another surface opposite to the one surface of the supporting substrate; and
a distance regulating portion formed between the circuit board and the substrate housing to adjust a spaced distance between the circuit board and the substrate housing according to movement of the circuit,
wherein the distance regulating portion enables the circuit board to be fixed to the substrate housing via a fixing element formed in the circuit board and the substrate housing.

2. The lighting device of claim 1, wherein the distance regulating portion comprises projections disposed to correspond to the fixing element, and the circuit board is fixed to the substrate housing by an insertion connection of the projections and the fixing element.

3. The lighting device of claim 1, wherein the fixing element has a larger width than a width of the distance regulating portion inserted into the fixing element.

4. The lighting device of claim 1, wherein the distance regulating portion contains an elastic material, and the spaced distance between the circuit board and the substrate housing is adjusted according to the movement of the circuit board by the elastic material.

5. The lighting device of claim 4, wherein the distance regulating portion is configured such that at least two distance regulating portions are arranged in a horizontal direction between the circuit board and the substrate housing, and the elastic material is changed according to an arrangement position in the vertical direction.

6. The lighting device of claim 1, wherein the distance regulating portion is arranged on the other surface corresponding to a spaced portion between the light emitting elements.

7. The lighting device of claim 1, further comprising a light guide plate disposed to be spaced apart from the circuit board, wherein a width or a thickness of the distance regulating portion is adjusted according to at least one of the number of the light emitting elements, an arrangement position of the light emitting elements, and a size of the light guide plate.

8. The lighting device of claim 7, wherein an arrangement position of the distance regulating portion in a vertical direction between the circuit board and the substrate housing is adjusted according to at least one of the number of the light emitting elements, the arrangement position of the light emitting elements and the size of the light guide plate.

9. The lighting device of claim 8, wherein the distance regulating portion is configured such that at least two distance regulating portions are arranged in a horizontal direction between the circuit board and the substrate housing, and the number of the distance regulating portions arranged in the horizontal direction is determined according to the arrangement position in the vertical direction.

10. The lighting device of claim 1, wherein the circuit board has a supporting substrate including a first region to which the light emitting elements are mounted, and a second region extending to be bent from the first region, and the substrate housing is fixed to the second region of the circuit board.

11. The lighting device of claim 10, wherein the circuit board further comprises: a bending portion between the first region and the second region; a bending hole formed in the bending portion; a pad portion having pad wirings connected to the light emitting elements in the first region; and a string portion having string wirings intended for transmitting electrical signals to the light emitting elements in the first region or the second region.

12. A display device, comprising:
a lighting device; and
a light guide plate disposed to be spaced apart from the lighting device,
wherein the lighting device comprises: a circuit board in which light emitting elements are mounted to one surface of a supporting substrate; a substrate housing disposed to be spaced apart from another surface opposite to the one surface of the supporting substrate; and a distance regulating portion formed between the circuit board and the substrate housing to adjust a spaced distance between the circuit board and the substrate housing according to movement of the circuit board,
wherein the distance regulating portion functions to fix the circuit to the substrate housing via a fixing element formed in the circuit board and the substrate housing.

13. The display device of claim 12, wherein the distance regulating portion comprises projections disposed to correspond to the fixing element, and the circuit board is fixed to the substrate housing by an insertion connection of the projections and the fixing element.

14. The display device of claim 12, wherein the fixing element has a larger width than a width of the distance regulating portion inserted into the fixing element.

15. The display device of claim 12, wherein the distance regulating portion contains an elastic material, and the spaced distance between the circuit board and the substrate housing is adjusted according to the movement of the circuit board by the elastic material.

16. The display device of claim 15, wherein the distance regulating portion is configured such that at least distance regulating portions are arranged in a horizontal direction between the circuit board and the substrate housing, and the elastic material is changed according to an arrangement position in the horizontal direction.

17. The display device of claim 12, wherein the distance regulating portion is arranged on the other surface corresponding to a spaced portion between the light emitting elements.

18. The display device of claim 12, wherein a width or a thickness of the distance regulating portion is adjusted according to at least one of the number of the light emitting elements, an arrangement position of the light emitting elements, and a size of the light guide plate.

19. The display device of claim 18, wherein an arrangement position of the distance regulating portion in a vertical direction between the circuit board and the substrate housing is adjusted according to at least one of the number of the light emitting elements, the arrangement position of the light emitting elements, and the size of the light guide plate.

20. The display device of claim 19, wherein the distance regulating portions control is configured such that at least distance regulating portions are arranged in a horizontal direction between the circuit board and the substrate housing, and the number of the distance regulating portions arranged in the horizontal direction is determined according to the arrangement position in the vertical direction.

* * * * *